A. J. BRIGGS.
MILLING MACHINE AND THE LIKE.
APPLICATION FILED DEC. 6, 1912.

1,174,815.

Patented Mar. 7, 1916.
7 SHEETS—SHEET 1.

Fig. 1.

Witnesses
W. A. Williams
Alley & Peck

Inventor
A. J. Briggs
By
Hubert E. Peck, Attorney

A. J. BRIGGS.
MILLING MACHINE AND THE LIKE.
APPLICATION FILED DEC. 6, 1912.

1,174,815.

Patented Mar. 7, 1916.
7 SHEETS—SHEET 2.

A. J. BRIGGS.
MILLING MACHINE AND THE LIKE.
APPLICATION FILED DEC. 6, 1912.

1,174,815.

Patented Mar. 7, 1916.
7 SHEETS—SHEET 4.

Witnesses
W. A. Williams
Allen E. Peck

Inventor
A. J. Briggs
By
Hubert E. Peck
Attorney

A. J. BRIGGS.
MILLING MACHINE AND THE LIKE.
APPLICATION FILED DEC. 6, 1912.

1,174,815.

Patented Mar. 7, 1916.
7 SHEETS—SHEET 5.

Witnesses
U. A. Williams
Albert Peck

Inventor
A. J. Briggs
By
Herbert Peck, Attorney

UNITED STATES PATENT OFFICE.

ARTHUR J. BRIGGS, OF SYRACUSE, NEW YORK.

MILLING-MACHINE AND THE LIKE.

1,174,815.  Specification of Letters Patent.  Patented Mar. 7, 1916.

Application filed December 6, 1912. Serial No. 735,341.

*To all whom it may concern:*

Be it known that I, ARTHUR J. BRIGGS, a citizen of the United States, residing at Syracuse, in the county of Onondaga and State of New York, have invented certain new and useful Improvements in Milling-Machines and the like, of which the following is a specification.

This invention relates to certain improvements in metal working machines, and particularly relates to machines such as milling machines, for cutting metals, or other hard material, by means of milling or other circular rotary cutters or saws; and the objects and nature of the invention will be readily understood by those skilled in the art in the light of the following explanation of the accompanying drawings illustrating what I now believe to be the preferred embodiment from among other constructions, formations and arrangements within the spirit and scope of my invention.

An object of the invention is to provide certain improvements in and relating to means for propelling and controlling work tables or supports.

A further object of the invention is to provide certain improvements in and relating to feed works for work tables or supports.

A further object of the invention is to provide certain improvements in arrangements, constructions and combinations of parts and features whereby a milling machine, or the like, of high efficiency and extreme accuracy will be produced.

The invention consists in certain novel features in construction and in combinations and arrangements as more fully and particularly pointed out and specified hereinafter.

Among other features my invention involves, in whole or in part, the following:—

The arrangement and location of the table feeding train of mechanism carried by the bed and doing away with universal joints and splines which slide with the operation of the table, and the direct action of the feed and feed changing mechanism through a direct train of spur gears running at comparatively high speed giving a more rigid and powerful feed than is found on other milling machines of similar size in common use. A table feed screw fixed at both ends with a feed nut journaled in the bed provided with thrust bearings and with a threaded screw in combination with a rack, pinion, and hand wheel for quick return of the table giving a combination of power screw feed and rapid hand operation which is very simple and effective; the pitch of the screw being sufficient to allow the nut with its thrust bearings to spin freely when the worm is thrown out of engagement and the table is moved by the hand wheel. An automatic stop for the table which allows the work to be moved rapidly by means of the hand wheel close to the cutter, but prevents the work from being jammed against the cutter at the risk of damage, and so arranged that when the power feed is thrown in the pin engaging the automatic stop is withdrawn, allowing the table to proceed by the power feed.

Referring to the accompanying drawings.

In the particular example illustrated by the drawings, I show the machine provided with an upright arched main frame consisting of a pair of vertical parallel spaced strong rigid uprights 1, rising from and integral with a base 2, and connected by and integral with a cross member 3. The member 3, constitutes the upper end of the frame and in the mechanical expression illustrated forms a rigid arch between the uprights 1. The uprights 1, are preferably approximately the same or similar in cross section. The upper portion of the frame, below the arch 3, is formed with alined enlarged openings extending transversely through the uprights 1, each upright having one opening therethrough.

The opening 4, through one of the uprights, the left hand upright in the drawings, is fitted with a suitable bearing, 5, for the short spindle 6. The outer end of this spindle is extended to receive its driving means. In the particular example illustrated, the spindle driving means comprises a spur gear 7, keyed on said extended end of the spindle, and meshing with a pinion 8, driven by belt pulley 9, and mounted on shaft 10, fixed to and projecting laterally from the left hand upright of the frame. The spindle is formed with a longitudinal bore 11, having a taper, to receive the tapered end 12, of the removable arbor 13.

Figure 10:
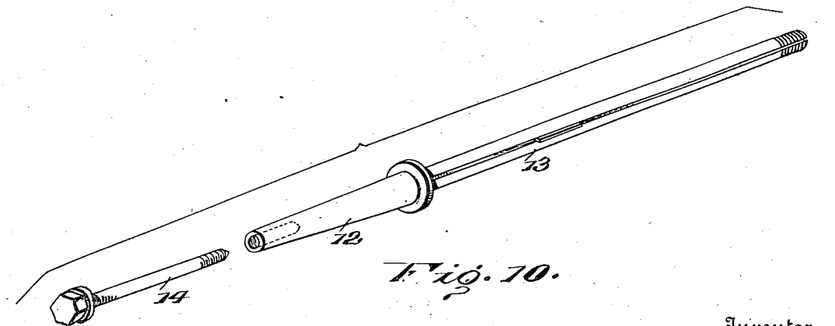
Fig. 10, is a detail detached perspective of the removable arbor and means for securing the same in the spindle.
Figure 11:
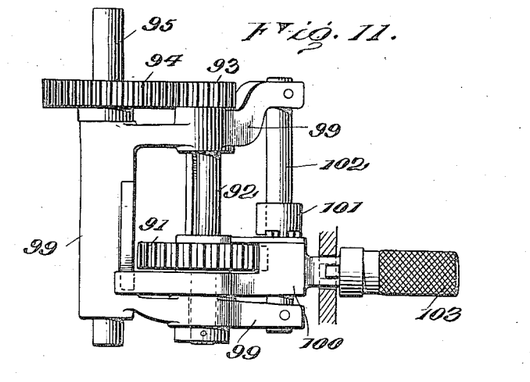
Fig. 11, is a detail sectional view of speed changing means involved in the table feed mechanism.
Figure 15:
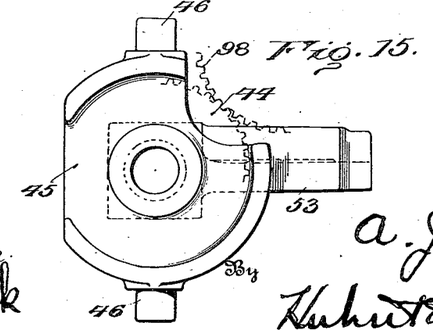

A removable headed bolt 14, can be provided to longitudinally screw into the arbor to tighten and hold and center the arbor end in the spindle bore and in operative driven relation with respect to the spindle. The head of this bolt bears against the outer end of the spindle and is readily accessible for rotation to tightly lock the arbor to the spindle or for unscrewing to permit removal of the bolt, and thereby free the arbor for longitudinal outward removal thereof from the inner end of the spindle.

The arbor extends across the space between the frame uprights 1, and through and beyond the enlarged opening 15, in the right hand upright, and a suitable removable support is provided in said opening for the right hand end of the arbor. This removable support, in the particular example illustrated consists of a split expansible bushing 16, concentrically fitting in said opening and provided with a tapered longitudinally adjustable expanding bolt or key 17, whereby the bushing can be expanded and thereby rigidly locked in the opening, or whereby the bushing can be allowed to contract to its normal external diameter and thereby loosened in the opening to permit removal of the bushing longitudinally and outwardly from the frame upright and the opening therein. The bushing, in the particular mechanical expression illustrated, is formed integral with a central concentric hub 18, connected with the outer wall or circumferential portion of the bushing by several radial webs or spokes. This central hub is fitted with or forms the bearing 19, for the outer end of the arbor and this bearing is preferably adjustable whereby the desired fit on the arbor can be maintained.

The intermediate portion of the arbor between the frame uprights is provided with any suitable rotary cutting saws or milling tools, such as 20, and if so desired, the milling tools can be held in the desired position on the arbor by spacing sleeves or washers 21. The milling centers are clamped or otherwise confined in the desired position on and to rotate with the arbor by any suitable means and in any suitable manner as will be well understood by those skilled in the art.

The opening 15, through the right hand frame upright is of such diameter as to permit the arbor and its milling cutters to pass longitudinally and outwardly therethrough in the absence of the supporting bushing. The diameter of the opening 15, exceeds the diameter of the largest milling or other cutter the machine is adapted or intended to receive so that the cutter can be freely passed through said opening to or from the arbor, without removing the arbor, or with the arbor if it is desired to apply and remove the cutters with and while on the arbors.

The bushing 16, can be removed from the opening 15, after the key or tapered expanding bolt 17, has been loosened and forced longitudinally in a direction to permit the bushing to contract and loosen in said opening. The arbor and its cutters can then be longitudinally drawn outwardly through the opening with the bushing if so desired, or after the bushing has been removed, the inner end of the arbor having been first released from its driving and centering spindle. If so desired, the arbor can remain fixed and centered in its spindle, and the bushing can be slipped longitudinally and outwardly from the outer end of the arbor, so that the spacing sleeves and cutters can then be freely slipped longitudinally through the opening and from or onto the arbor, for readjustment thereon or for application of different cutters thereto.

When the arbor bearing the cutters has been restored to and locked and centered in the spindle, or when the cutters have been properly arranged on the arbor, if the arbor was not removed, the bushing can then be placed on the outer end of the arbor and slipped into proper position in the opening 15, and then expanded by the key or bolt 17, to rigidly lock the same in place in the frame upright.

The machine is provided with a bed 23, arranged below the arbor and between the frame uprights 1, and supported thereby and confined or clamped thereto. This bed is rendered vertically adjustable on a vertical fixed threaded shaft 24, (rigid with the base and arranged between the lower portions of the frame uprights) through the medium of a rotary nut 25, mounted in the bed and meshing with and vertically adjustable on said threaded shaft and geared to and rotated by a shaft 26, provided with a hand crank.

The frame uprights are formed at their inner or adjoining sides with similar rigid longitudinal guides 27, each having its longitudinal edges 28, oppositely beveled, or undercut. The bed, at the center of its horizontal length is formed with depending opposite side similar vertically-elongated slideways 29, parallel with and arranged between and slidable on said guides, and each at one longitudinal edge having a fixed lip or flange 30, fitting the beveled edge 28, of a guide and at the opposite longitudinal edge having a gib 31, fitting the opposite beveled edge 28, of its guide. The gibs are secured by transverse bolts 32, extending through said slideways of the bed and through the gibs, and provided with exposed and accessible clamping nuts 33. When the bed is to be adjusted vertically, the nuts 33, are loosened to loosen the gibs. The bed can then be freely moved vertically on the guides 27, by rotating the shaft 26, as hereinbefore described.

When the bed has been adjusted to the desired position, the nuts 33, are tightened and the guides of the frame uprights are thereby rigidly gripped between the flanges 30, and gibs 31, of the bed slideways.

A reciprocating work table 34, is arranged below the intermediate portion of the arbor and centrally between the frame uprights and on and carried by the bed. The under side of the table is formed with suitable opposite side or spaced longitudinal parallel guides 35, fitting and interlocking with corresponding slideways in the top of the bed in longitudinal sliding adjustment and against lateral and vertical play and objectionable looseness. The table can be fitted and confined to the bed in sliding adjustment and against objectionable looseness and vibration in accordance with any suitable and approved method and means. The upper surface of the table can be formed in any suitable manner to receive the work and to provide for clamping and securing thereof in the desired manner to the table. The table is provided with a horizontal nonrotary feed screw 37, fixed thereto and arranged longitudinally thereof. This screw is preferably arranged centrally between the guides 35, of the table and a distance below the same, and if so desired can be carried by and at its ends fixed in rigid ears or flanges 38, depending from the table.

The feed screw is centrally arranged between the frame uprights, and extends through and meshes with a rotary feed nut 39, mounted in a suitable journal box or bearing in the central top portion of the bed. Suitable end thrust bearings 40, preferably ball bearings, are provided between the ends of the nut and the opposite ends of the journal box in which the nut is confined to freely rotate. These thrust bearings hold the nut in the bed against independent endwise movement. At one end the nut is provided with an exterior driving gear or worm wheel 41, rigid therewith. The nut is rotated by suitable means, to drive the table on its feed stroke through the medium of feed screw 37. In the example illustrated, the driving means for the nut 39, comprises a vertically disposed rotary worm 42, arranged to the left of the gear 41, and adapted to mesh therewith and rotate the same. This worm is fixed on the upper end of an upright shaft 43, driven by a spur gear 44, fixed on the lower end of the shaft.

The shaft 43, is mounted in and carried by an upright frame or bracket 45, supported by and vertically rockable on horizontal alined trunnions 46, arranged at the lower end of the bracket and suitably mounted in the bed. This tiltable or rocking bracket is so mounted and arranged that it is capable of swinging to carry the worm to and from operative driving engagement with the gear 41, of the table feed nut, for the purpose of stopping and starting the feeding movement or stroke of the table. In the example illustrated, the rocking bracket is yieldingly held in one direction by a spring 47, while the position of the bracket is determined by a vertically swingable hand lever 48, fixed to a horizontal rock shaft 49, mounted on a stud carried by the bed and provided with a crank arm or toe 50, provided with a lateral stud or roll 51, fitting and working in curved slot 52, in a flange or plate 53, attached to or forming a part of said swingable bracket. The plate 53, is vertically arranged on a lateral projection from the upper portion of the bracket and if so desired can be adjustably secured thereto by bolts 54. The hand lever 48, is accessible at the right hand side of the bed, and can be swung vertically by the operator to throw the feed-nut-driving worm 42, into and from engagement with the nut gear 41, to start and stop the table feeding stroke. In the particular example illustrated, the spring 47, is so applied as to constantly tend to swing the bracket to the left and hence maintain the worm out of engagement with the feed nut.

Figure 1:
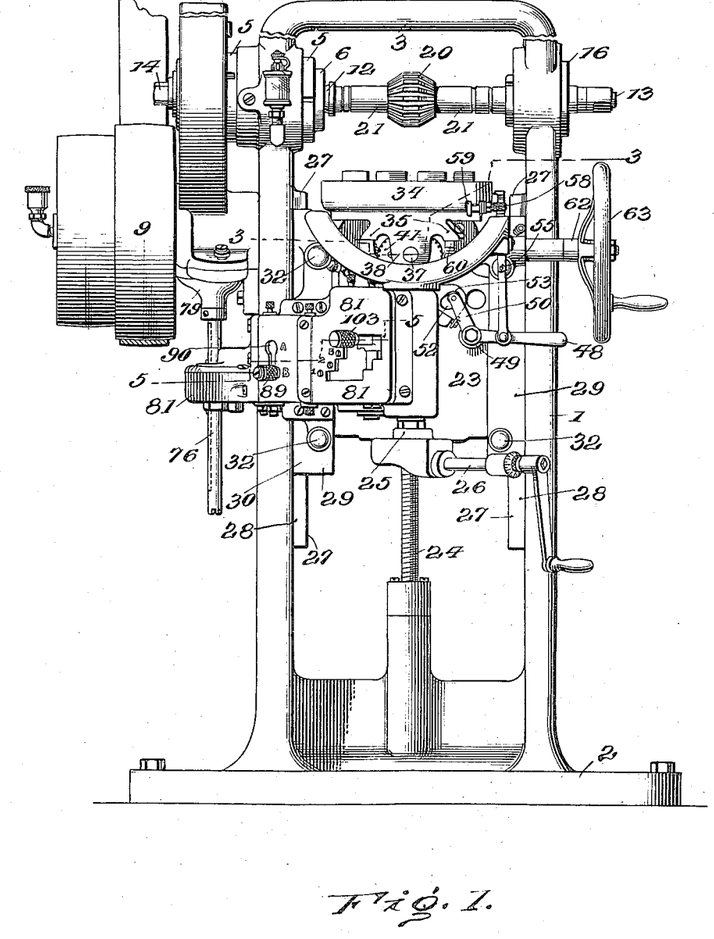
—Figure 1 is a front elevation of a machine embodying one mechanical expression of my invention.
Figure 2:
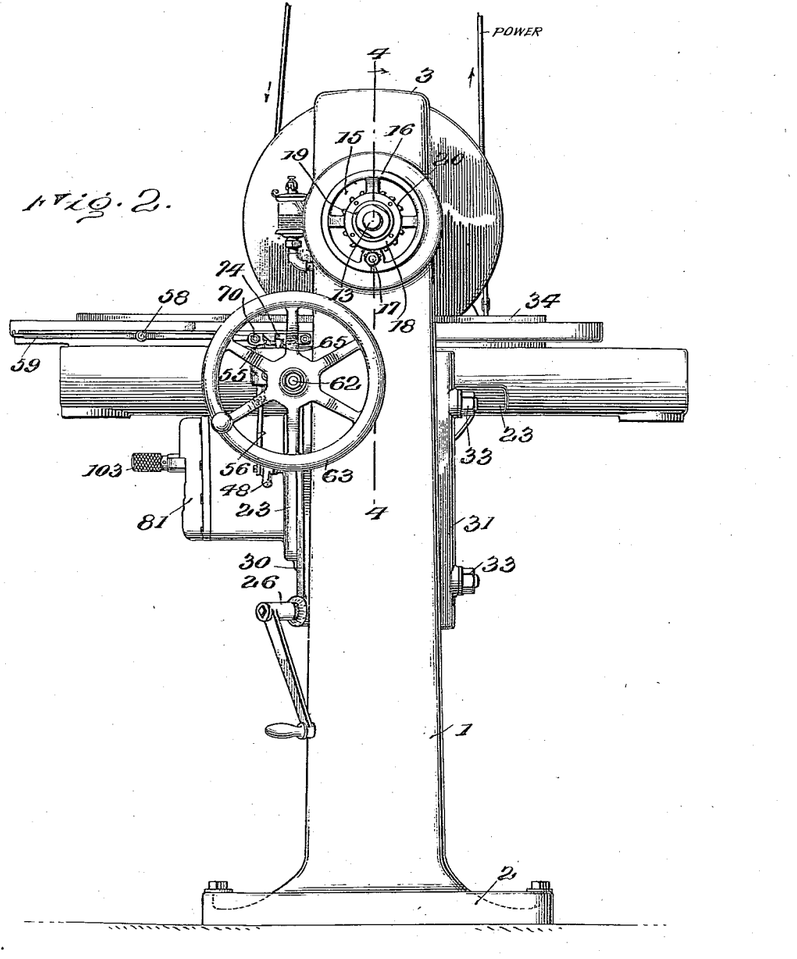
Fig. 2, is a side elevation thereof.
Figure 3:
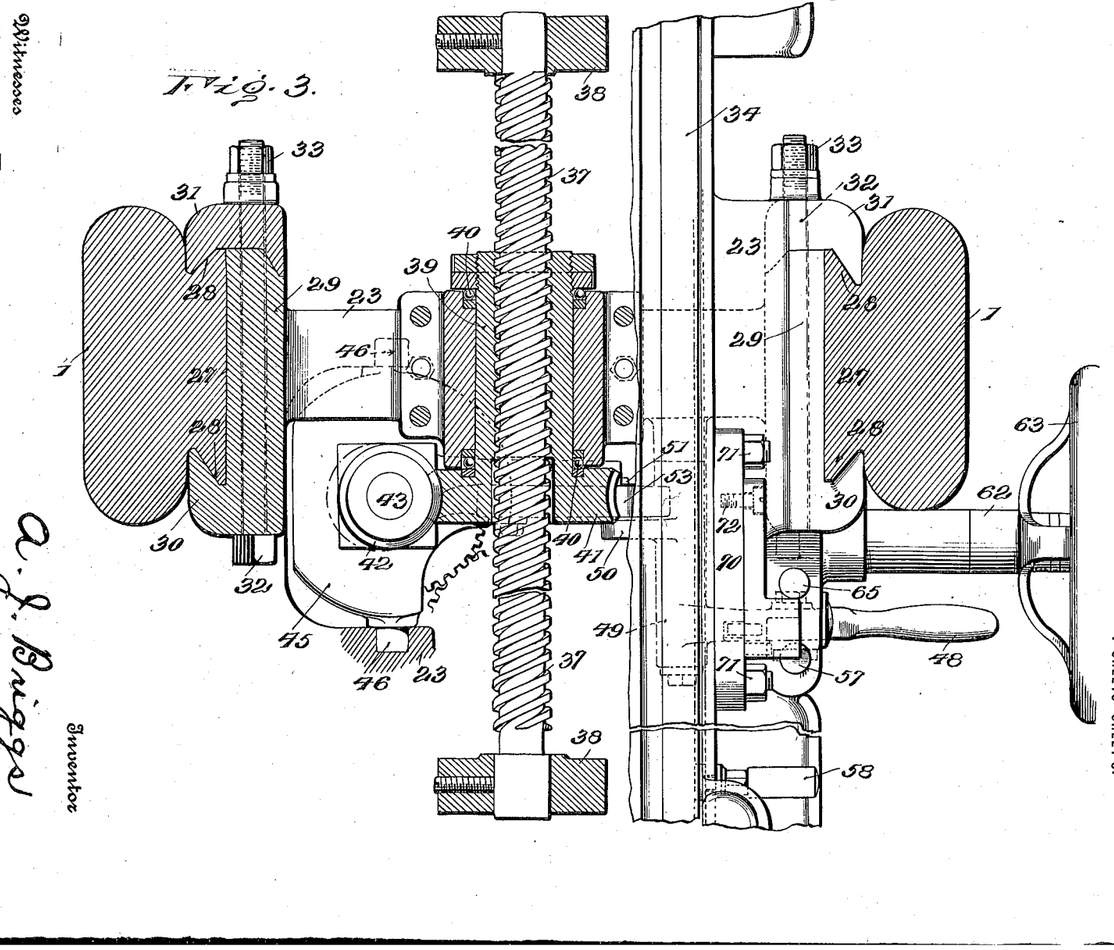
Fig. 3 is a horizontal cross section taken in the plane of the line 3—3, Fig. 1.
Figure 4:
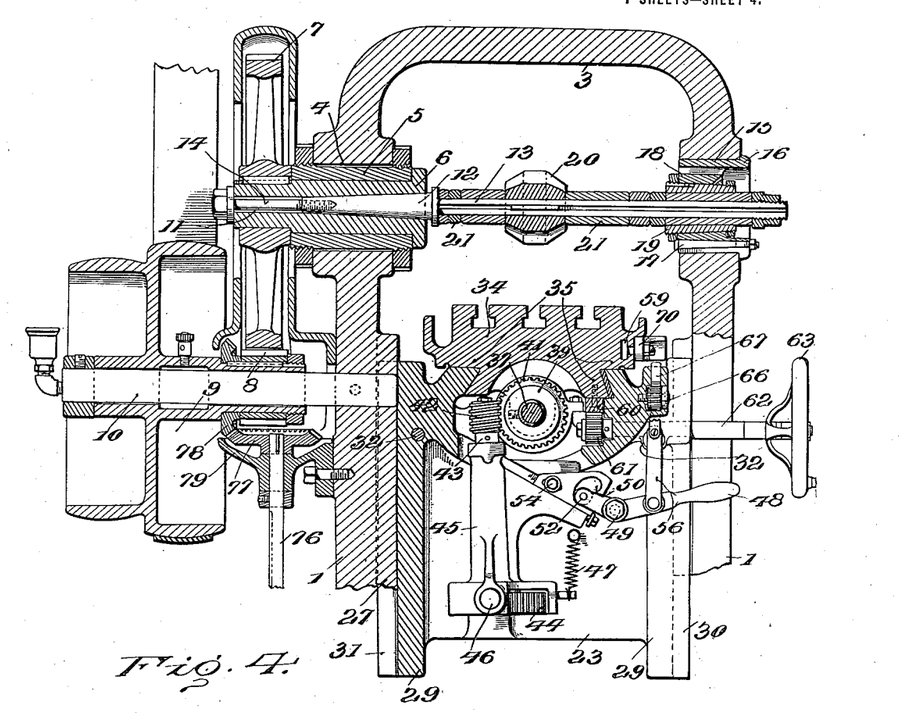
Fig. 4, is a vertical section in the plane of the line 4—4, Fig. 2.
Figure 5:
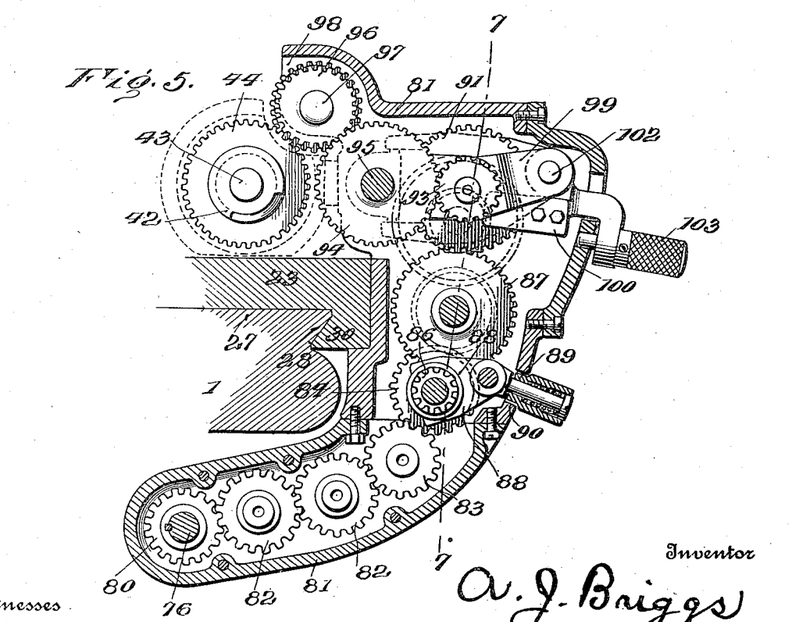
Fig. 5, is a horizontal detail section approximately in the plane of the line 5—5, Fig. 1.
Figures 6, 12:
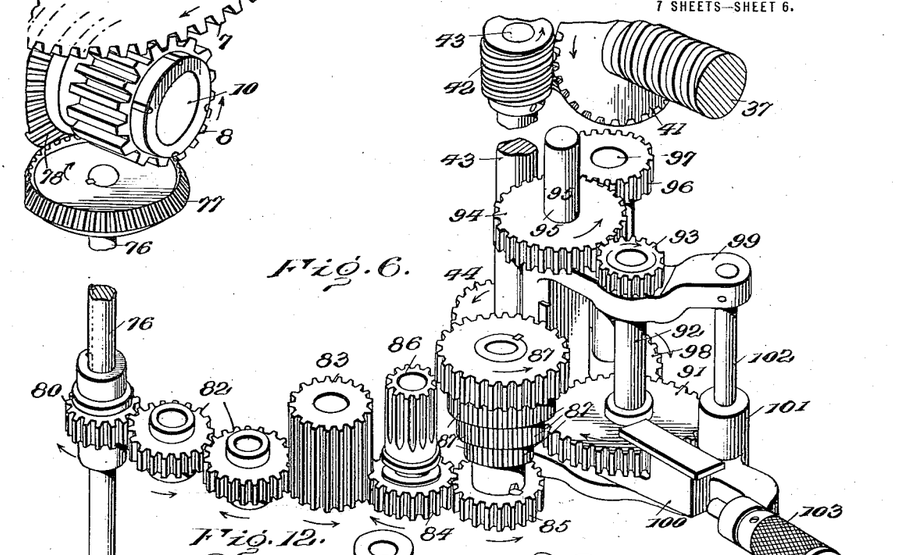
Fig. 6, is a detail perspective, to a certain extent diagrammatic of the table feeding mechanism.
Figs. 12 and 13, are detail views of parts of the speed changing devices involved in the table feed mechanism.
Figures 7, 13:
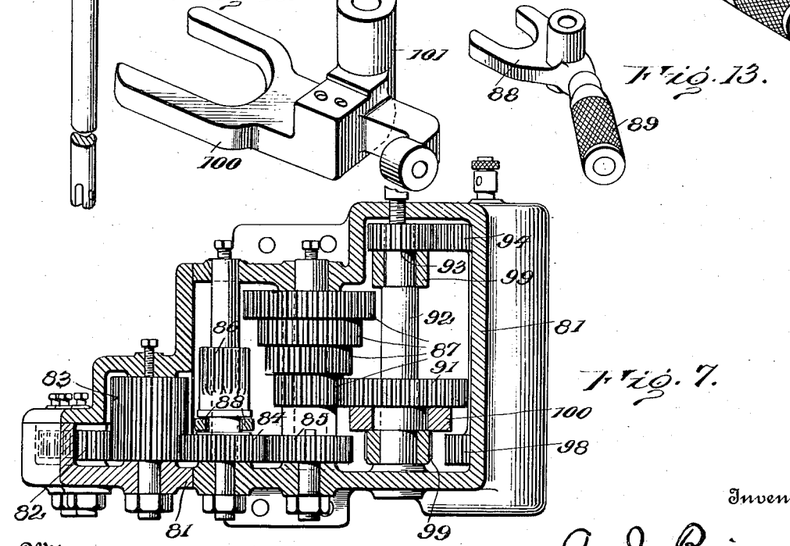
Fig. 7, is a detail vertical section, approximately in the plane of the line 7—7, Fig. 5.

The cam and locking slot 52, is so peculiarly formed and arranged with respect to the axes on which the bracket and toe 50, rock, that when the lever 48, is swung upwardly and the toe 50, thereby swung downwardly, the roll or stud 51, will move downwardly along the curved cam edge wall of said slot and draw the bracket toward the right to bring the worm into operative engagement with the nut (see Fig. 4). The stud or roll 51, then occupies a locking or holding depression at the lower end of slot 52, and maintains the bracket at its limit of movement toward the right and against the tension of its spring.

Figures 8, 14:
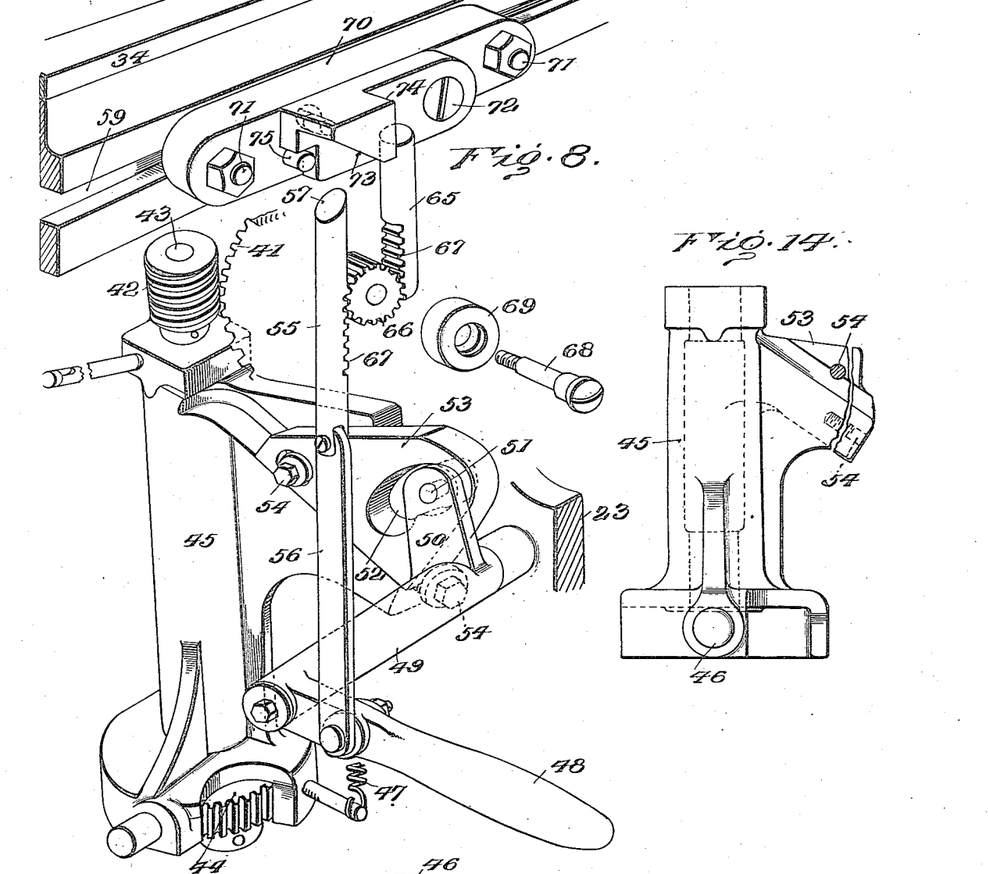
Fig. 8, is a detail perspective, to a certain extent diagrammatic, of parts of the automatic table stop mechanism and hand lever for throwing the table feed mechanism into and out of gear with the table.
Figs. 14 and 15, are detail views of the swinging frame carrying the worm shaft and whereby the worm is thrown to and from operative engagement with the rotary nut on the feed screw of the table.
Figure 9:
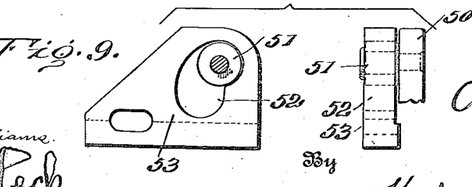
Fig. 9, shows in side and edge elevation, an element included in the means for throwing the table feed mechanism into and out of gear.

When the lever 48, is swung downwardly and the toe 50, upwardly, the bracket is free to move, under the action of its spring, the slight distance to the left necessary to throw the worm out of operative engagement with the table feed nut, see Fig. 8.

The adjustment hereinbefore described, between the plate 53, and the body of the bracket, is provided so that the parts can be set to attain and maintain the desired accurate operative relation between the lever and the bracket. I provide means for automatically operating the lever 48, to throw the worm from operative engagement with the table feed nut, when the table completes each feed stroke. This mechanism consists of a vertical slide or pin 55, in a guide way or passage extending vertically through the right hand upper central portion of the bed. The lower end of said slide depends below said guideway and is pivotally joined to the hand lever 48, by a link 56, while the upper end of said slide extends above the bed beside the right hand longitudinal edge of the work table and at its upper extremity 57, is transversely beveled upwardly and rearwardly. This slide 55, reciprocates vertically (through the portion of the bed formed with said guideway) as the hand lever 48, is rocked, and the hand lever is swung down by said slide when the slide is depressed.

The slide is adapted to be depressed by a projection, pin or stud 58, projecting laterally from the front portion of the right hand edge of the work table. This pin is adjustable longitudinally of said edge of the table and any suitable means can be provided for this purpose. For instance, I show the right hand edge of the table provided with a longitudinal T slot or groove 59, and the pin is adjustable longitudinally thereof and provided with means for rigidly clamping the same therein at the desired position with respect to the length of the table to permit the table to have the feed stroke desired.

When the hand lever 48, is elevated and the worm is driving the table feed nut, the slide 55, is in elevated position with its beveled end 57, in the path of the pin 58, carried by and projecting laterally from the feed table. As the feed table completes its feeding stroke, said pin engages the beveled end 57, of said slide and thereby depresses the slide from the path of the pin and swings the lever 48, downwardly to release bracket 45, so that the spring 47, can rock said bracket to carry the worm from operative engagement with the table feed nut. The table is thereby automatically thrown out of gear with its feed mechanism. I provide mechanism whereby the feed table can be quickly returned, and manipulated back and forth while the power feed mechanism is out of gear. For instance, I show a rack 60, arranged longitudinally of and fixed to the under portion of the table, to the right of the feed screw, and a pinion 61, meshing with said rack and carried by a shaft 62, mounted in the bed and provided with a hand wheel 63, for operating the shaft. I show this shaft arranged horizontally in the bed with its hand wheel exposed and accessible at the right hand side of the bed. The feed table can thus be quickly and easily returned and manipulated by hand.

The screw threads of the feed screw 37, and nut 39, are so formed and arranged that the nut will spin freely and loosely on the screw when the worm 42, is out of operative position, and the feed table is moved by the rack and pinion.

I provide an automatic stop mechanism, operated in conjunction with the power feed stop mechanism, to prevent the table from being propelled so far forward by the hand operated rack and pinion as to cause the work to objectionably strike the milling cutters. This automatic stop mechanism comprises a vertically movable stop pin 65, arranged parallel with and a distance in rear of the slide 55, and confined in a vertical passage or guide way in the right hand edge portion of the bed, to reciprocate vertically. This stop pin is reciprocated by the vertical movement of the slide 55, but in an opposite direction, through the medium of the intervening toothed pinion 66, meshing with longitudinal racks 67, formed on the slide 55, and the pin 65. The pinion 66, is loosely fitted in a socket in the bed arranged between and opening into the passages in the bed containing the slide and pin, and is mounted on a journal or screw 68, carrying a cap 69, to close the outer end of the socket containing the pinion.

The stop pin 65, when in projected or elevated position, (that is, when the table feed mechanism is out of gear), coöperates with a pivoted vertically swingable stop block carried by a plate 70, clamped to the right hand longitudinal edge of the table at the desired position longitudinally thereof, and adjustable longitudinally thereof through the medium of slot 59, and clamping bolts 71. This block 70, is located the desired distance in rear of the pin 58, and the vertically swingable stop is at its rear end pivoted thereto by horizontal pin 72. The front end 73, of said stop is beveled downwardly and rearwardly while in rear of said beveled face the stop is formed with a rearwardly facing vertical stop face or shoulder 74.

The front end of the pivoted stop rests on and is supported in operative position by a pin 75. When the table feed mechanism is in gear with the table and the table is on its feed stroke, the slide 55, is elevated, while the stop pin 65, is depressed out of the path of movement of the pivoted stop carried by block 70. When the table reaches the end of its feed stroke and the slide 55, is depressed and the table feed mechanism is thrown out of gear, the stop pin 65, is thereby automatically projected upwardly into the path of movement of the pivoted stop. When the table is moved forward by the hand-operated quick-return mechanism, the pivoted stop slips forward past the pin 65, as the beveled face 73, of said stop engages and rides up on said pin, thereby swinging the free end of the stop upwardly until the stop passes the pin and drops down to normal position in front thereof. The work table is now in its forward position and the work can be adjusted and fixed thereon. When the work has been fixed for the cutting operation, the table can be quickly moved by the hand operated mechanism, to bring the work close to the cutters preparatory to starting the cutting operation. When the table is thus moved to bring the work close to the cutters, the shoulder 74, will engage the projected stop pin 65, at the position in the movement of the table where the feed stroke is to begin, and before the work engages or jams against the cutters. In other words, the pin 65, prevents the table being thrown by hand so far in the direction of the feed stroke as to cause the work to engage the cutters and cause damage, and hence acts as a safety guard and permits the operator to quickly and rapidly bring the table up to the feed stroke starting position as he knows that by so doing he is not inviting injurious contact of the work and cutters. When the table has thus been brought up to the feed stroke starting position with the stop shoulder 74, engaging pin 65, the operator swings the hand lever 48, upwardly and thereby throws the table feed mechanism into gear, and elevates the slide 55, and simultaneously depresses the stop pin 65, to a point below and out of contact with the stop shoulder 74, so that the table can proceed on its feed stroke.

The movable or rock shaft 43, of the table feed mechanism is actuated through a chain of spur gears from a power shaft 76. This power shaft is vertically arranged to the left of the left hand frame upright 1, and is vertically elongated so as to correspond approximately in length to the range of vertical adjustment of the bed. At its upper end this vertical shaft 76, is mounted in a bracket 79, fixed to said frame upright and forming a part of or carrying a housing for the gearing 7, 8. The shaft 76, is driven through the medium of bevel gears 77, 78, connecting the upper end of said shaft and the power pulley 9, so that said shaft is continuously driven with the arbor driving spindle. The said chain of spur gears comprises and is actuated by a gear 80, splined to and driven by and vertically slidable on, the shaft 76. Said chain or train of spur gears comprising the gear 80, is carried by and mounted in a rigid box or housing 81, fixed to the front left hand portion of the bed and extending horizontally and laterally therefrom across the front edge of the left hand frame upright to and surrounding and carrying the gear 80. This housing or box is rigid with the bed and moves vertically therewith.

The train of spur gears comprises a series of meshing gears 82, 83, 84 and 85 having the same number of teeth and mounted on vertical parallel shafts fixed in the box 81. Any suitable train of gearing can be provided in the box 81, to drive the shaft 43 and said train of gearing can comprise any suitable speed changing mechanism. For instance, I show the gear 83, longitudinally elongated, and the gear 85, rigid with a vertical series of upper variously sized gears 87, and a gear 84, intervening between gears 83, and 85, provided at its upper end with a reduced pinion 86. The gear 84 and its pinion 86, are vertically movable to carry the gear 84, up out of mesh with the gear 85, and to bring the pinion 86, into mesh with the large upper gear 87. The gear 84 and its pinion 86, can be moved vertically and held in the desired position by the fork 88, having an accessible handle 89, at the exterior of the box 81, and extending outwardly through a slot 90 therein. The train of gears further comprises a gear 91, rotating and vertically movable on a shaft 92, carrying a pinion 93, meshing with a gear 94, rotating on shaft 95 and meshing with a pinion 96. Pinion 96, is rigid with and drives a shaft 97, and the shaft 97 is provided with and drives a pinion 98, meshing with and driving the gear 44, on the lower end of the worm shaft 43.

In addition to the speed changing mechanism hereinbefore described, I provide another and further feed changing mechanism in the train of gears comprising the gear 91, and the smaller gears 87 below the topmost gear 87. The gear 91, is movable vertically on its shaft into engagement with any one of the variously sized gears 87. In order to permit the lateral or horizontal movement of the gear 91 as it is placed in mesh with the different gears 87, I mount the shaft 92 in a horizontally swingable frame 99 centered and swinging on the shaft 95. The gear 91, is raised and lowered and the frame 99, is swung laterally to the various adjustments required, by means of a vertically movable fork or yoke 100, engaging said gear 91 and carried by a slide 101, confined to move vertically on rod 102, forming a part of the swinging frame 99. The yoke or fork 100, is provided with a handle 103, projecting forwardly to the exterior of the box 81, and readily accessible at the front of the machine. The box 81 is provided with an opening through which the handle 103, projects and in which it is movable vertically and laterally and the edge wall of this opening can be formed with a number of steps or notches to hold the yoke and parts attached thereto in the various adjustments.

I do not wish to limit my invention to the speed changing mechanisms described nor to the particular train of gearing illustrated. However, material advantages in structure and operation are attained by providing a direct train of spur gears to actuate the table feed worm, said train of gears being vertically movable with the bed.

It is evident that various changes, modifications and variations in the forms, constructions, and arrangements and combinations described, might be resorted to without departing from the spirit and scope of my invention as defined by the following claims and hence I do not wish to limit myself to the particular mechanical expression of my invention disclosed hereby.

Desiring to protect my invention in the broadest manner legally possible, what I claim is:—

1. In combination, a frame comprising rigidly connected spaced uprights, a rotary arbor carried by said uprights and adapted to actuate a rotary cutter, a vertical feed-table-drive shaft arranged and supported at the outer side of one of said frame uprights, driving means for said arbor and said shaft, a vertically-adjustable bed arranged between and guided by said uprights and provided with a housing rigid therewith and projecting laterally therefrom past said last mentioned upright and to said shaft, a feed table movable on said bed, and feed-table driving mechanism comprising power transmission means extending through said housing to and driven by said shaft, said transmission means embodying speed change gearing having a shifting handle extending through and operative from the exterior of said housing.

2. In combination, a frame comprising spaced uprights, an arbor extending between said uprights and adapted to carry a cutting tool, a bed extending between the inner sides of and vertically adjustable on said uprights, a feed table movable on said bed below said arbor, a feed-table-drive shaft arranged at the exterior and supported independently of said bed, means for driving the arbor and shaft, a support projecting from said bed and extending to said shaft, a nut and screw feed for said table, an upright shaft provided with gearing for actuating said feed, a swingable bracket arranged in said bed and carrying said upright shaft, means for controlling said bracket for throwing said gearing into and from operative connection with said feed, and transmission means driving said upright shaft and driven by said drive shaft, said transmission means extending to said drive shaft along and carried by said support.

3. In combination, a frame comprising spaced uprights, a bed arranged between and vertically adjustable on said uprights, a feed table movable on said bed, an arbor above said bed and extending between said uprights and adapted to receive and drive a cutter, a vertical-table-drive shaft arranged beyond the outer side of one of said uprights and supported against substantial vertical movement, means for driving said arbor and said shaft, said bed provided with a housing movable vertically therewith and projecting laterally therefrom to said shaft, and feed works for said table comprising a series of meshing spur gears arranged in said housing and extending to and including a spur gear rotated by and movable vertically on said shaft, said gears rotating on vertical axes carried by said housing, substantially as described.

4. In a milling machine or the like, in combination, a frame, a driving member, a bed adjustable vertically of the frame and driving member, said bed provided with a rigid housing fixed thereto, a feed table carried by the bed, and feed mechanism for said table driven by said member and comprising a nut and screw feed, and a horizontal series of spur gears arranged in said housing and extending to said driving member and including spur gear speed changing mechanism provided with operating devices extending to the exterior of said housing.

5. In a milling machine or the like, in combination, a frame, a driving member, a bed adjustable vertically of the frame and driving member, a feed table carried by said bed, and feed mechanism for said table driven by said member and carried by and movable vertically with said bed and comprising a nut and screw feed and a horizontal series of spur gears extending to said driving member and including spur gear speed changing mechanism provided with operating handles accessible at the exterior of said bed.

6. In a milling machine or the like, in combination, a bed, a feed table mounted thereon, quick return mechanism for said table comprising a rack fixed to and arranged longitudinally of the table and a hand operated pinion carried by the bed and meshing with the rack, and feed mechanism for said table comprising a non-rotary screw fixed to and arranged longitudinally of the table, a rotary nut receiving and meshing with said screw and mounted in the bed and provided with thrust bearings and driving means for said nut adapted to be moved into and out of operative relation with said nut to stop and start the feeding movement of the table, said nut being arranged to spin freely on said screw when out of operative relation with its driving means and when the table is moved by said pinion and rack.

7. In a milling machine or the like, in combination, a bed having a rotary feed nut mounted therein against longitudinal movement, a feed table having a non-rotary screw fixed thereto and arranged longitudinally thereof and extending through and in mesh with said nut, and actuating means for said nut provided with mechanism for throwing the same into and out of gear with the nut, said nut being free to spin on said screw when said screw is moved therethrough by said table and the actuating means is out of gear with the nut.

8. In a milling machine or the like, in combination, a bed having a rotary feed nut mounted therein against longitudinal movement, a feed table having a non-rotary screw fixed thereto and arranged longitudinally thereof and extending through and in mesh with said nut, actuating means for said nut provided with mechanism for throwing the same to and from operative engagement with the nut, and a quick return hand operated mechanism for said table, the meshing threads of the nut and screw permitting the nut to be spun by the screw during the quick return movement of the table.

9. In a milling machine or the like, in combination, a bed having a rotary feed nut mounted therein against longitudinal movement, a feed table having a non-rotary screw fixed thereto and arranged longitudinally thereof and extending through and in mesh with said nut, said screw formed to spin said nut on the return movement of the table, actuating means for said nut provided with a movable bracket for throwing said means to and from operative relation with respect to the nut, manually controlled means for moving said bracket, and means for quickly returning said table by hand when said actuating means is out of operative relation to said nut.

10. In a milling machine or the like, in combination, a bed, a feed table consisting of a longitudinal non-rotary screw at its ends fixed to said table and a rotary nut on said screw and mounted in said bed against longitudinal movement, for driving the table on its feed stroke, said nut spinning freely on said screw on the return stroke of said table, a nut and screw feed for said table, actuating mechanism for said feed comprising a movable member whereby said mechanism is thrown into and from gear with said feed, a swingable spring held bracket controlling the position of said member, a manually actuated device controlling the position of said bracket, and independent manually operated means for returning and reciprocating said table when said actuating mechanism is out of gear with said feed.

11. In a milling machine or the like, in combination, a bed, a feed table, a nut and screw feed for said table consisting of a screw secured to the table and a rotary nut receiving said screw for propelling the table on its feed stroke, said nut provided with an exterior worm gear, actuating mechanism for said feed comprising a nut-rotating worm and a movable member whereby said mechanism is thrown into and from gear with said feed, a swingable spring held bracket mounted in the bed and controlling the position of said member, and a hand lever controlling the position of said bracket, said hand lever mounted in the bed to swing on an axis independent of and parallel with the axis on which said bracket swings and having operating connection with said bracket to swing and hold the same against the tension of said spring.

12. In a milling machine or the like, in combination, a bed, a feed table, a nut and screw feed for said table, actuating mechanism for said feed comprising a movable member whereby said mechanism is thrown into and from gear with said feed, a hand lever for moving and controlling the position of said movable member, and automatic table feed stroke stop mechanism connected with said hand lever to operate the same to move said movable member to throw the actuating mechanism out of gear with said feed, said stop mechanism comprising an adjustable element carried by the table and a movable device carried by the bed and adapted to be engaged and moved by said element to throw the table feed out of gear, said movable device being automatically moved to normal position by the movement of said hand lever in actuating the movable member to position throwing the actuating mechanism into gear with said feed.

13. In a milling machine or the like, in combination, a bed, a feed table, feed mechanism for said table comprising a movable member whereby said mechanism can be thrown into and out of gear to stop or start the table feed and a manually operated device for controlling the position of said member, and automatic table feed stroke stop mechanism comprising a member carried by and movable with the table, and a slide connected with said device to be projected to normal position in the path of movement of said member carried by the table when said device is moved to throw the feed mechanism into gear, said slide adapted to be engaged and depressed from normal position by said member carried by the table and to thereby operate said manually operated device to throw the feed mechanism out of gear.

14. In a milling machine or the like, in combination, a bed, a feed table, feed mechanism for said table comprising a movable member whereby said mechanism can be thrown into and out of gear to stop or start the table feed, a quick return mechanism for actuating said table when the feed mechanism is out of gear, an automatic table feed stroke stop mechanism comprising an element movable with the table and a movable member normally arranged in the path of and adapted to be operatively moved by said element and operatively connected with said movable member to be moved to normal position therewith and to move the same to throw the feed mechanism out of gear, and a stop device for said table when moved by said quick return mechanism comprising a movable element carried by the table and a coöperating stop pin carried by the bed and operatively connected with said movable member of the table feed stroke mechanism to be projected to table stopping position when said movable member of the feed mechanism is moved to throw said mechanism out of gear.

15. In a milling machine or the like, in combination, a bed, a feed table, feed mechanism therefor, a pin or the like adjusted longitudinally of the table and carried thereby, means for throwing the feed mechanism out of gear with the table comprising a beveled end slide carried by the bed and connected to operate said means to throw the same out of gear when the slide is depressed, said slide projecting into the path of said pin and adapted to be engaged and depressed thereby, a feed table stop pin carried by the bed, and operative connections from said slide to said pin to withdraw the pin from operative position when said slide is elevated and to throw said pin to operative position when said slide is depressed, said table being freely movable back and forth to the limit prescribed by said pin when said slide is depressed.

16. In a milling machine or the like, in combination, a bed, a feed table, feed mechanism for said table, means for throwing the feed mechanism out of gear with the table, hand actuated return mechanism for moving the table when said feed mechanism is out of gear, a pivoted stop block carried by and adjustable longitudinally of the table and having a stop shoulder facing in one direction and a beveled surface facing in the opposite direction, and a stop operatively connected with said means, said stop being projected by said means into the path of movement of said stop block when said feed mechanism is out of gear and withdrawn from said path when said mechanism is in gear.

17. A milling machine or the like having a feed table stop automatically moved to table stopping position when the table feed mechanism is thrown out of gear with the table and automatically moved to inoperative position when the table feed mechanism is thrown into gear, the feed table being freely movable back and forth to the limit prescribed by said stop when said stop is in stopping position, and a hand lever connected to approximately simultaneously throw the feed mechanism into and from gear and said stop from and to stopping position.

18. A milling machine or the like having the feed mechanism for the work table comprising a non-rotary screw secured to the table, a rotary feed nut on said screw and having a worm gear, a nut-rotating worm carried and driven by a shaft mounted in a swingable bracket whereby said worm can be moved to and from operative engagement with said gear, said nut driving said table on its feed stroke, said nut spinning freely on said screw when said worm is disengaged from the nut and the table is moved on its return stroke.

19. In combination, a frame, a bed, a rotary nut mounted in the bed against longitudinal movement and provided with an exterior gear, a feed table, a non-rotary screw arranged longitudinally of said table and at its ends fixed thereto to propel the table longitudinally, said screw movable longitudinally through said nut and actuated longitudinally by the rotation thereof, and actuating mechanism for rotating said nut through the medium of said exterior gear, said nut and screw being so relatively formed that the nut spins on the screw on the return movement of the table.

20. In combination, a frame, a support, a nut mounted in said support to freely rotate therein, a feed table provided with a feed screw movable through said nut and propelled thereby to drive said feed table, said screw being arranged longitudinally of said table and permanently fixed thereto against rotation to propel said table longitudinally when said nut is rotated, and actuating mechanism for rotating said nut and embodying means whereby said mechanism can be operatively disconnected from said nut, said table being freely movable longitudinally when said nut is thus disconnected, said nut being then free to spin on said screw as the screw passes longitudinally therethrough, substantially as described.

21. In combination, a frame, a support having a journal box, a nut carried by and rotatable in said journal box and confined thereto against substantial longitudinal movement therein and provided with a concentric driving gear, a reciprocatory feed table provided with a longitudinal non-rotary feed screw at its ends fixed to the table, said screw meshing with said nut and being propelled longitudinally therethrough by said nut when the nut is driven, said nut spinning freely on the screw on the return movement of the table, and actuating gearing applied to said gear of the nut for rotating the nut to propel the carriage.

22. In combination, a bed, a rotary nut mounted therein and having a concentric exterior gear, a feed table movable on said bed and carrying a longitudinal non-rotary feed screw meshing with said nut and longitudinally moved therethrough by the rotation of the nut to propel the table on its feed stroke, a bracket movably mounted in said bed, a rotary shaft carried by said bracket and provided with a nut driving pinion, said bracket being movable to throw said pinion to and from operative engagement with said gear, the meshing threads of the nut and screw permitting the nut to spin on the screw when the table is moved on its return stroke, actuating mechanism for driving said shaft, and a handle lever for controlling the position of said bracket.

23. In combination, a feed table, a bed, a gear mounted in said bed and operatively connected to drive said table on its feed stroke, an upright bracket arranged in said bed and swingable on a transverse axis, a rotary shaft carried by said bracket and provided with a gear adapted to be moved to and from operative driving engagement with said gear in the bed by the swing of said bracket, actuating mechanism for rotating said shaft, a spring constantly tending to swing said bracket to its limit in one direction, and a vertically swingable lever fulcrumed in the bed and having operative connection with said bracket for rocking and controlling the position of said bracket.

24. In combination, a feed table, a table feed gear, a bed for said table, a swingable upright bracket supported in the bed by a transverse axis arranged at the lower end of said bracket, a rotary upright shaft carried by said bracket and at its upper end provided with a gear adapted to be moved to and from driving engagement with said table feed gear by the swing of said bracket, actuating gearing for and applied to the lower end of said shaft, a spring constantly tending to swing said bracket in one direction, and a vertically swingable lever mounted in said bed and having operative connection with said bracket to swing and control the position thereof.

25. In combination, a feed table, a table feed gear, a bed, a spring held swingable bracket mounted in said bed, a rotary shaft carried by said bracket and provided with a gear brought into and from driving engagement with said table feed gear by the swing of said bracket, shaft driving gearing, said bracket provided with a laterally projected slotted portion, and a swingable hand lever mounted in said bed and provided with a projection in said slotted portion for swinging and controlling the position of said bracket.

26. In combination, a hollow bed, a feed table movable thereon and provided with a feed screw, a rotary worm gear for actuating said table on its feeding stroke, said gear being mounted centrally in said bed and rotating on an axis parallel with the direction of movement of the table, an upright rotary shaft arranged within said bed and at its upper end provided with a worm to engage and drive said gear, said worm being arranged beside said axis, a bracket mounted in said bed and carrying said shaft and arranged to swing vertically in a plane at right angles to said axis, means for driving said shaft, and a hand lever mounted in said bed and operatively coupled to said bracket to swing and control the position thereof, said lever projecting laterally from said bed to an accessible position at the exterior thereof.

27. In combination, approximately parallel spaced frame uprights, a vertically adjustable bed arranged between and fitted to said uprights, a feed table movable on said bed, an elongated vertical drive shaft arranged at the outer side of one of said uprights, a support carried by and movable vertically with said bed and extending therefrom past said last mentioned upright to and vertically movable along said shaft, and table feed works comprising a train of gearing carried by and movable vertically with said support and extending to and actuated by said shaft.

28. In combination, a frame comprising a pair of rigid spaced uprights, a bed arranged between and vertically adjustable along the inner sides of said uprights, a reciprocatory feed table on said bed, a rotary arbor arranged transversely of said uprights and adapted to carry a rotary cutter above said table, a vertical feed-table-drive shaft arranged and supported exteriorly and independently of said bed, driving means for said arbor and said shaft, said bed provided with a housing projecting laterally therefrom and extending to said shaft, and feed works for said bed comprising power transmission means arranged in and carried by said housing and extending to and driven by said shaft and including movable speed change gearing provided with a shifting handle extending to and operative from the exterior of said housing.

29. In combination, in a milling machine, a bed, a feed table movable on the bed, table feed mechanism for actuating said table on its feed stroke, means for throwing said mechanism out of gear with the table, said table being freely movable by hand when said mechanism is thrown out of gear with the table, a stop carried by and adjustable longitudinally of the table with respect to the position of the work on the table, and a table stop carried by the bed and automatically moved to and from inoperative position with respect to said first mentioned stop when said mechanism is thrown out of and into gear with the table.

30. In combination, in a milling machine, a bed, a feed table movable thereon, feed table operating mechanism for actuating said table on its feed stroke, means for throwing said mechanism into and out of operative connection with the table, a table stop operatively connected with said means to be automatically moved to table stopping position when said mechanism is thrown out of operative connection with the table and to be moved to inoperative position when said mechanism is thrown into operative connection with the table, and a coöperating stop carried by the table and arranged to slip past said table stop on the backward movement of the table but to operatively engage said stop on the forward movement of the table when said table is out of operative connection with its operating mechanism.

31. In combination, a frame upright, a bed adjustable vertically thereon, a reciprocatory feed table on said bed, a rotary arbor adapted to receive and drive a rotary cutter above said table, a vertical feed-table-drive shaft arranged and supported independently of and exteriorly with respect to said bed, said bed provided with an exterior housing carried thereby and movable vertically therewith and extending therefrom to said shaft, and feed works for said table comprising a shaft in the bed and a power transmission train of spur gears therefor extending through said housing to and driven by said exterior drive shaft, certain of said gears mounted in said housing constituting speed change gears and provided with a movable shifting handle exposed and operative at the exterior of said housing.

32. In combination, a frame, a bed, a feed table movable thereon, a rotary feed-table-drive shaft, a nut and screw feed for said table, an upright rotary shaft having a pinion normally in mesh with and actuating said feed, a rockable mounting for said upright shaft provided with controlling means whereby said shaft can be moved to carry said pinion into and from mesh with said feed, a spur gear on and rotated by said drive shaft, a spur gear on and rotating said upright shaft, and a train of meshing spur gears in mesh with said gears on said shafts and transmitting power from said drive shaft to said upright shaft and including movable change speed spur gears provided with an accessible shifting handle.

33. In combination, a frame, a bed, a feed table movable thereon, a vertical feed-table-drive shaft, a nut and screw feed for said table, an upright shaft having actuating connection therewith, a train of meshing spur gears actuated by said drive shaft and actuating said upright shaft and extending from shaft to shaft, a housing in which said gears are mounted on vertical axes, said housing having an exterior wall with an elongated opening, at least one of said spur gears forming a speed change gear and provided with a controlling handle extending through and movable in said opening and accessible at the exterior of said walls.

34. In combination, an upright frame, a vertically adjustable bed, a feed table movable on the bed, a rotary arbor adapted to carry a rotary cutting tool above said table, a vertical feed-table-drive shaft supported and arranged at the exterior of the bed, a horizontal support rigid and vertically movable with the bed and extending exteriorly and horizontally therefrom to said shaft, and table feed works provided with power transmitting means extending along said exterior support to and actuated by said shaft and including change speed gears carried by said support and provided with a controlling handle accessible at the exterior of said support.

In testimony whereof I affix my signature in presence of two witnesses.

ARTHUR J. BRIGGS.

Witnesses:
W. H. EBELHORE,
E. S. BOYNTON.